United States Patent [19]

Raimond et al.

[11] 4,159,530
[45] Jun. 26, 1979

[54] DATA COLLECTION SYSTEM FOR USE WITH A SYSTEM OF FLEXIBLE WORKING HOURS

[75] Inventors: Jean-Pierre Raimond, Gif sur Yvette; Yvon Le Roy, Bures sur Yvette, both of France

[73] Assignee: Compagnie Industrielle des Telecommunications Cit-Alcatel S.A., Paris, France

[21] Appl. No.: 706,109

[30] Foreign Application Priority data

Jul. 22, 1975 [FR] France ............................ 7522868

[22] Filed: Jul. 16, 1976

[51] Int. Cl.² .......................... G06F 3/08; G06F 3/04; G06F 11/00
[52] U.S. Cl. ..................................................... 364/900
[58] Field of Search ............ 340/172.5, 149 R, 149 A, 340/153, 146.1 BA; 445/1; 179/2 DP; 364/900 MS File, 200 MS File, 406, 550; 235/92 T, 92 AC

[56] References Cited

U.S. PATENT DOCUMENTS

| | | | |
|---|---|---|---|
| Re. 29,057 | 11/1976 | Enikeieff et al. | 340/149 A |
| 3,327,292 | 6/1967 | Eriksson et al. | 340/172.5 |
| 3,344,408 | 9/1967 | Singer et al. | 340/172.5 |
| 3,622,995 | 11/1971 | Dilks et al. | 340/153 |
| 3,723,655 | 3/1973 | Zucker et al. | 179/2 DP |
| 3,740,725 | 6/1973 | Fletcher et al. | 340/172.5 |
| 3,775,752 | 11/1973 | Lorenzo | 340/172.5 |
| 3,805,234 | 4/1974 | Masters | 340/146.1 BA |
| 3,892,948 | 7/1975 | Constable | 340/149 R |
| 3,913,071 | 10/1975 | Garofalo, Jr. | 340/172.5 |
| 3,956,753 | 5/1976 | Armstrong et al. | 340/149 A X |
| 3,970,992 | 7/1976 | Boothroyd et al. | 340/172.5 |

*Primary Examiner*—Melvin B. Chapnick
*Attorney, Agent, or Firm*—Haseltine, Lake & Waters

[57] ABSTRACT

A terminal is connected by a transmission link to a computer coupler. The terminal has a reader for a worker's card or badge. A number written on the badge is sent to the computer for verification and is echoed back if OK. The return number is checked against the number sent and if still OK the badge number is displayed. Communication takes place over two telephone lines which may be taken from amongst pre-existing telephone lines in a work location. Other data such as time and total hours worked may be displayed by the terminal once a badge has been verified.

20 Claims, 5 Drawing Figures

DATA COLLECTION SYSTEM FOR USE WITH A SYSTEM OF FLEXIBLE WORKING HOURS

FIELD OF THE INVENTION

The present invention relates to a system for reading and processing data, especially for use by organisations operating a system of flexible working hours.

BRIEF SUMMARY OF THE INVENTION

The present invention provides a data collecting system for reading data and transmitting the same to a computer, the data collecting system comprising a terminal connected by a transmission link to a coupler which is suitable for connection as an input/output device to a computer, the terminal including a transmitter/receiver connected to the transmission link, a reader for reading data encoded on a data carrier which is removably presentable to the reader, a transmit logic circuit connecting the reader to the transmitter/receiver display means and a receive logic circuit connecting the transmitter/receiver to the display means. The transmission link includes two telephone lines, one for transmission in each direction, and the coupler includes a transmitter/receiver connected to the transmission link and of the same type as the transmitter/receiver of the terminal, and a logic circuit connecting the transmitter/receiver to input/output means suitable for connection to the computer. The three logic circuits are so arranged that, in operation, data is read from the data carrier, transmitted to the coupler, presented at its input/output means for verification by the computer, and if verified is echoed back from the computer via the coupler to the terminal where it is displayed by the display means. Several such terminal-coupler sets are connected, in operation, to the computer through a data bus to which the couplers are connected. The wires may be up to several kilometers in length and their respective ends of the terminal and coupler sides may be connected to interface units such as relays or photocouplers having high isolation capacity.

One advantage of this invention is the possibility of using ordinary telephonic lines which are part of an existing installation.

Exchanges of information on the two pairs of wires are preferably transmitted in an asynchronous serial mode. The terminal reader is preferably an optical reader of a known type allowing the identification number of cards or punched badges introduced into a slot of said reader to be read "passively". The display is preferably a seven segment display device also allowing information generated by the computer to be displayed at the terminal.

The coupler is located on one printed circuit board only, and several terminals can be coupled with the computer by means of several boards at the rate of one coupler board to a terminal.

BRIEF DESCRIPTION OF THE DRAWINGS

An embodiment of the present invention is described by way of example with reference to the accompanying drawings in which.

DETAILED DESCRIPTION

Figure 1:
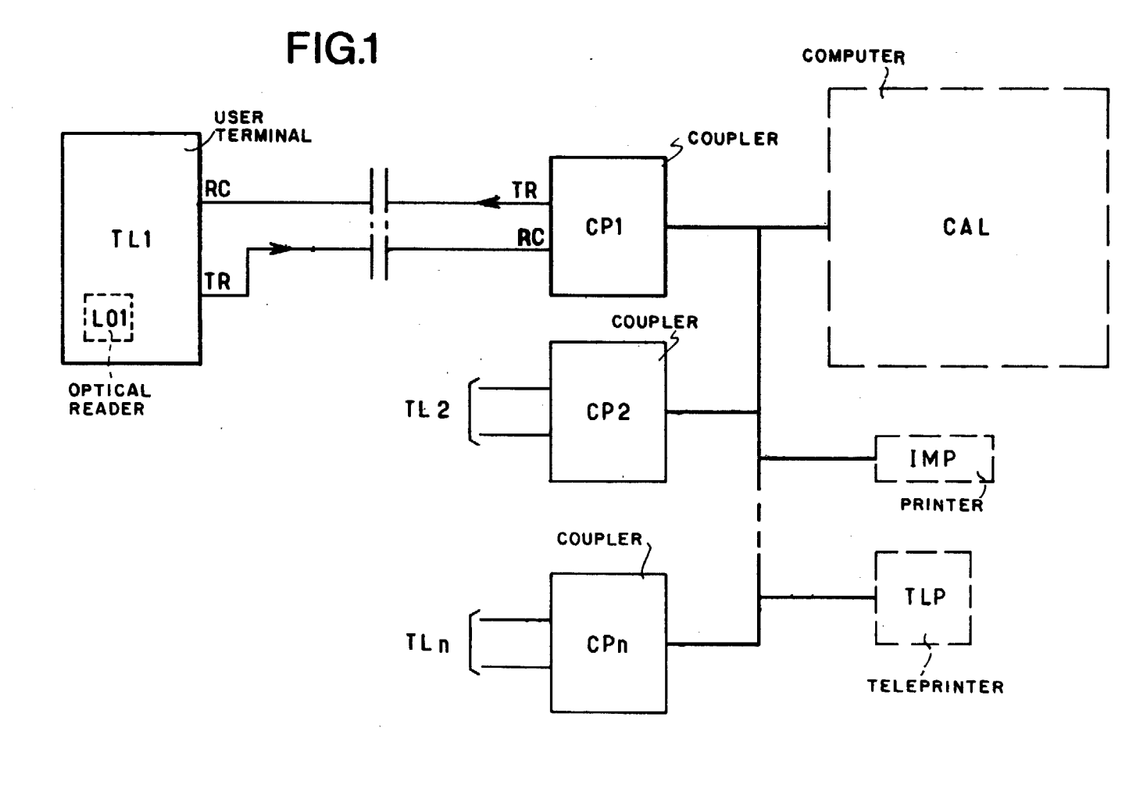
FIG. 1 is a block diagram which shows a plurality of terminal/coupler sets and their bus connected to a computer.

The reading and data processing system, shown in FIG. 1, comprises at least one user terminal TL1 with an optical reader L01 and a coupler CP1, the reader-coupler set being connected by two transmission channels, each channel permitting one way transmission of asynchronous serial data signals.

Several sets such as TL1-CP1, TL2-CP2, . . . TLn-CPn can be controlled by a computer CAL on which peripherals such as for example a printer IMP and a teleprinter TLP can also be connected. Transmission channels between a terminal TL and a coupler CP are shown in greater detail in FIG. 2. The terminal TL comprises a transmitter/receiver unit ER1 whose transmitter output TR operates the winding of a transmit relay RE1 having contacts which operate a receive relay RR1 at the coupler via a first two-wire link p1. Contacts of the receive relay RR1 are connected to a receive input RC of a transmitter/receiver unit ER2 of the coupler CP.

Figure 2:
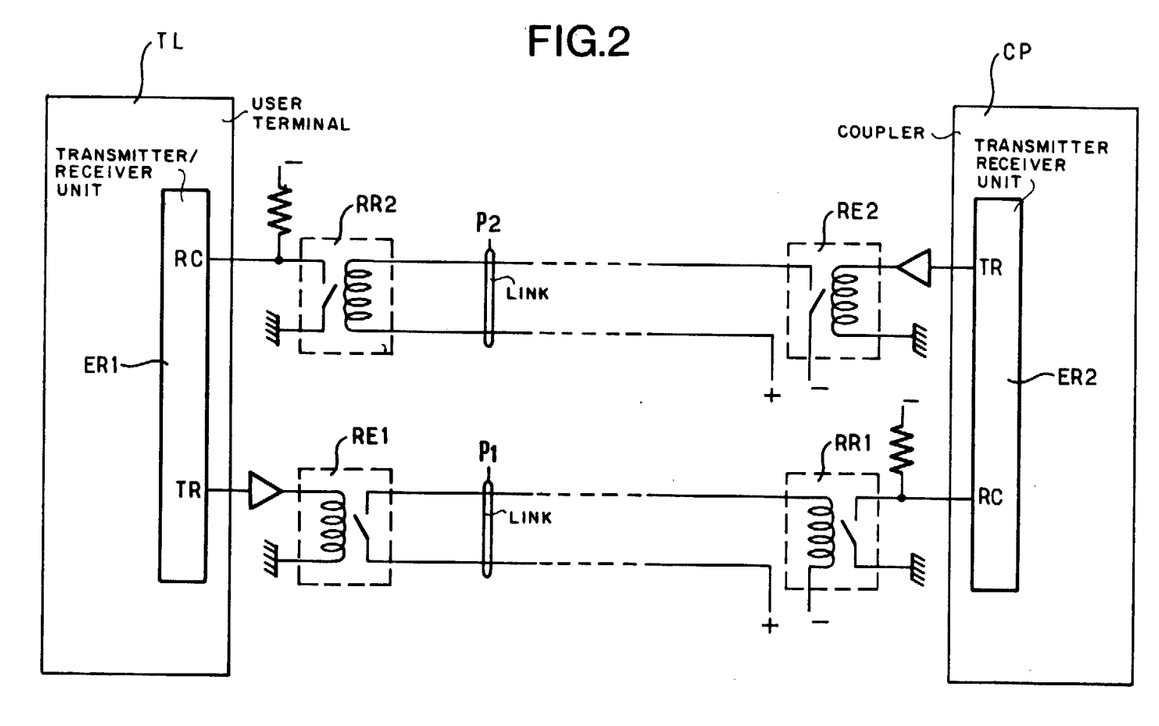
FIG. 2 is a diagram showing the wiring between a user terminal and its coupler.

In the same way the transmitter output TR of the unit ER2 of the coupler CP is connected to the winding of a second transmit relay RE2 having contacts which operate a second receive relay RR2 at the terminal via a second two-wire link p2. Contacts of the second receive relay RR2 are connected to the receive input RC of the transmitter/receiver unit ER1. The connections p1 and p2 are each formed by a telephone pair.

TRANSMISSION

Figure 3:
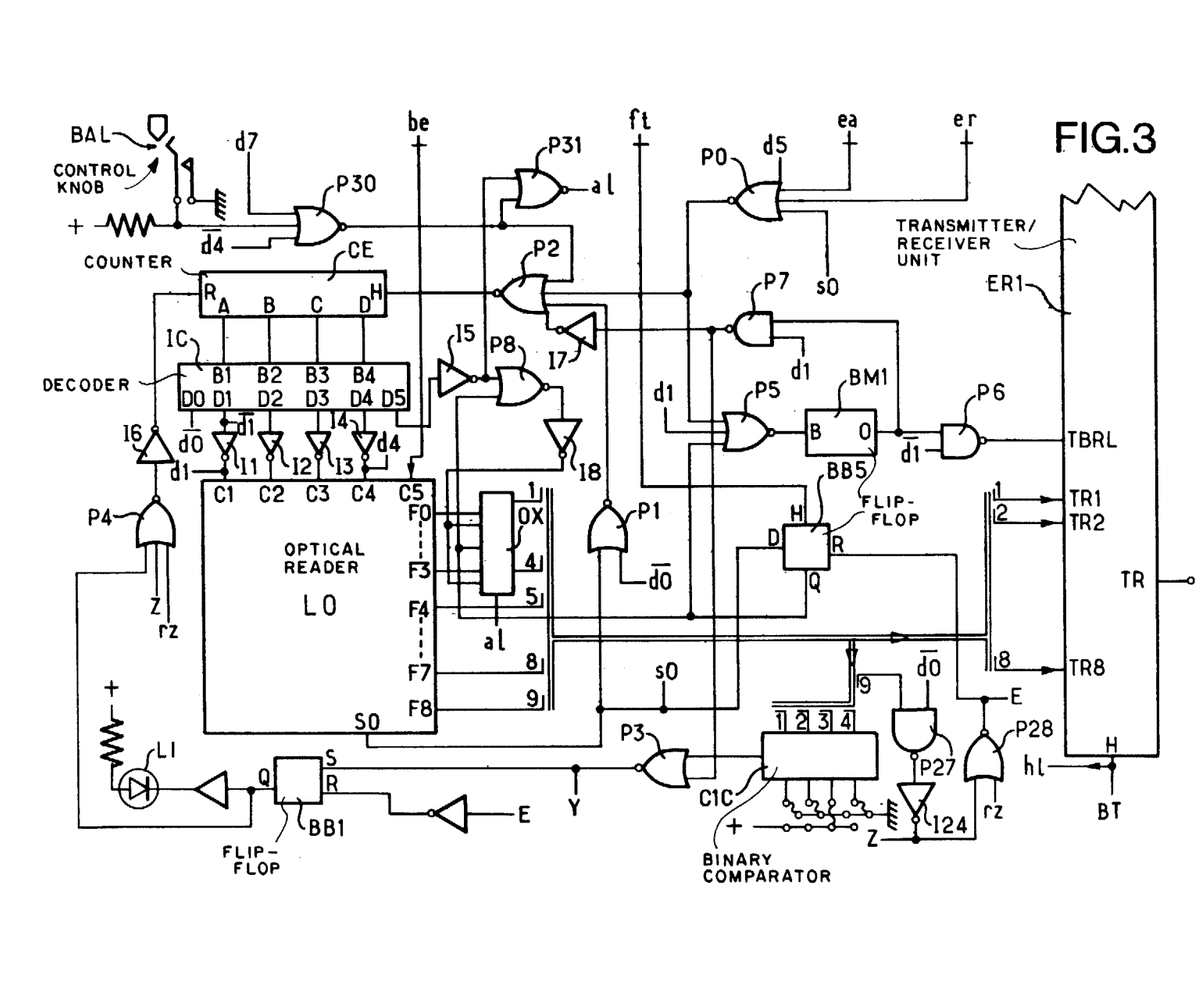
FIG. 3 is a circuit diagram of a sender of the terminal.

The user terminal has a sender shown in FIG. 3 including the optical reader L0 with five columns C1 to C5 of light emitting diodes. Four of said columns C1 to C4 are explored under the control of a sender binary counter CE connected to the columns via a binary to decimal decoder IC having outputs D1 to D4 connected to the columns C1 to C4 via inverting amplifiers I1 to I4.

At rest the counter CE is at a step 0 and the decoder IC presents a binary signal 1 at an output D0 on a connection marked d0. When an employee's badge is introduced into the optical reader L0, its presence is indicated by a binary signal 1 delivered at an output S0 to a connection marked s0. This signal causes the successive opening of NOR gates P1 and P2 thereby stepping the counter CE to step 1.

Every badge has a six digit number punched therein for its identification.

At step 1 of the counter CE the decoder IC indicates column C1 of the light emitting diodes. Four diodes of the columns C1 and C4 and eight diodes of the columns C2 and C3 are used. Only those diodes which are illuminated through the punched holes of the badge deliver a binary signal 1 on outputs F0 to F8 of the optical reader L0.

According to the column indicated one or two four-bit digits of the badge number are presented in binary code on transmitter inputs TR1 to TR8 of the transmitter/receiver unit ER1.

A circuit OX constituted by exclusive-OR gates is "transparent" to the binary signals of outputs F0 to F3. Thus, the first digit of the badge number to be read is compared in a binary comparator CIC to a wired digit allocated to the terminal.

If the first digit read is different from the wired digit, the comparator CIC delivers a wrong comparison signal on a "NOR" gate P3 which controls the change of state of a bistable flip-flop BB1. This flip-flop causes the lighting of a lamp LI which signals that the badge has been introduced into a terminal other than the one to which it is assigned. A connection Y on the output of the gate P3 causes the badge to be ejected as will be seen further on. The bistable flip-flop BB1 controls the opening of a NOR gate P4 which resets the sender binary counter CE through an inverter 16.

At step one of the counter CE the decoder IC sets a monostable flip-flop BM1 via a NOR gate P5 (connection d1). The output of the monostable BM1 is connected to an inhibit input TBRL of the transmitter/receiver ER1 via a NAND gate P6. However, the other input of the NAND gate P6 is connected to the step 1 output D1 of the decoder IC via a connection $\overline{d1}$ in an arrangement such that the transmission of the first digit of the badge is inhibited, this digit is used only to verify that the badge is one assigned to the terminal.

When the monostable BM1 is triggered it delivers a pulse opening a NAND gate P7 which, through a inverter amplifier 17 connected in series with a NOR gate P2 moves the counter CE to step 2. Output D1 of the decoder IC passes to state 1, which causes the opening of the gate P6 which allows transmission of the following digits. The first and second digits to be transmitted are read on column C2 and transmitted in parallel via outputs F0 to F7 of the optical reader to inputs TR1 to TR8 of the transmitter/receiver unit ER1. This unit transmits them serially to the coupler CPI via output TR at the rhythm of clock signals hL provided by a time base BT. After the transmission of the second digit the terminal waits for return of said digits to its receiver from the coupler. On their return the receiver delivers a return signal on input er of a NOR gate P0 which moves the counter CE to step 3 via the gate P2. This indicates column C3 allowing the reading and the transmission of the third and fourth digits. As previously, the counter CE is stepped to step 4 by the return signal delivered on er and the fifth digit is transmitted. The counter then waits for the badge number to be displayed by the terminal.

The digits of the badge number transmitted to the computer are echoed back by the latter and received, through the coupler, on input RC of the receiver of the send-receive unit ER1. Receipt is made by pairs of digits after serial-parallel transfer of binary signals on unit outputs R1 to R8 (see FIG. 4).

Figure 4:
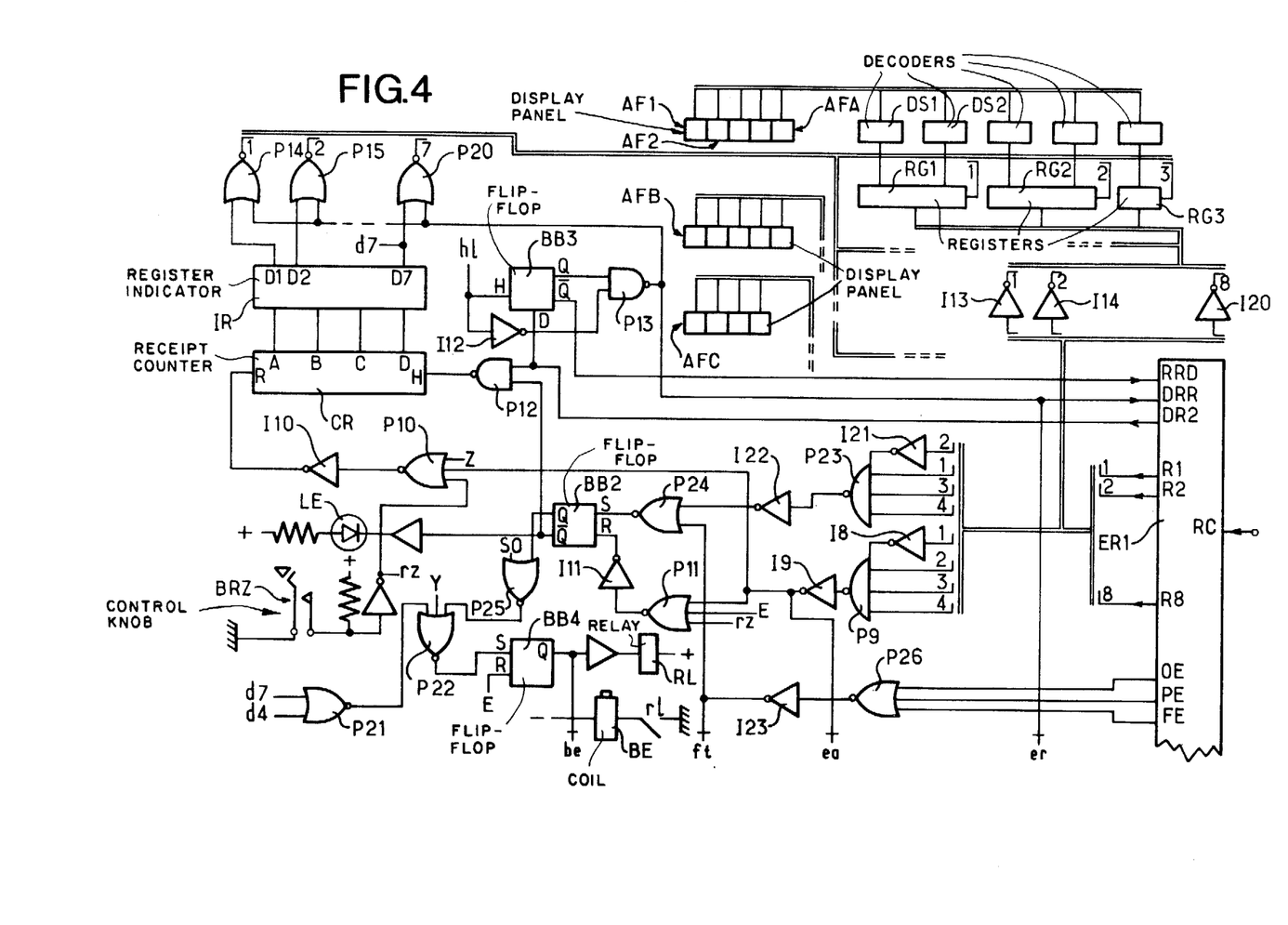
FIG. 4 is a circuit diagram of a receiver of the terminal.

The receipt of digits to be displayed is preceded by a characteristic binary number (14) whose configuration is received on a detection NAND gate P9 with the help of inverter 18. Detection of the number 14 allows:

the resetting of a receipt counter CR, by a circuit with a NOR gate P10 and inverters I9 and I10, the extinction of an error lamp LE which may be shining by a circuit with a NOR gate P11, inverters I9 and I11, and a bistable flip-flop BB2 whose repositioning input is connected to output of inverter I11.

At receipt in a buffer register of transmitter/receiver unit ER1 of the first two digits sent back by the computer, the transmitter/receiver unit presents a state 1 signal on an output DR2 which signals the presence of said digits in said register. The output DR2 is connected to a NAND gate P12 whose output is connected to clock input of the receipt counter CR which moves to step 1. The output DR2 is also connected to data inputs of a D-type bistable flip-flop BB3. Output Q of the flip-flop BB3 is connected to a NAND gate P13 which receives clock signals hL via an inverter I12. The output of the gate P13 is connected firstly to an input DRR of the unit ER1 and secondly to the first inputs of seven NOR gates P14 to P20 whose second inputs are respectively connected to outputs D1 to D7 of a register indicator IR formed by a decoder associated with the receipt counter CR. The unit ER1 receives from the gate P13 the order to transfer the first two digits into a register RG1 marked by the decoder IR working under the control of counter CR positioned at step 1. The transfer command received on input RRD of the units returns the signal delivered on output DR2 to state O. The two first digits are transferred simultaneously into register RG1 through outputs R1 to R8 of the transmitter/receiver unit and inverters I13 to I20. The Q output of the flip-flop BB3 delivers afterwards a signal on input RRD to allow the clearing of data received in the buffer register.

The first two digits transferred into register RG1 are respectively decoded by BCD to seven segment decoders DS1 and DS2 and displayed on display devices AF1 and AF2 of a display panel AFA.

When the two following digits have been loaded into the buffer register of unit ER1, the latter moves the counter CR to step 2 via the output DR2. The register indicator IR designates register RG2 and the display progresses as previously.

The badge number (five digits) is thus displayed on the display device set AFA.

When the computer sends the number of hours of work accumulated in the present week, for example: the cumulative total is displayed on display panel AFB. Finally the credit or debit of hours respectively designated by + or − sign opposite is displayed on display panel AFC. At the end of data receipt, the terminal will have displayed fourteen digits and receipt counter CR, at the rate of one step per pair of digits received, will have reached step 7.

Output d4 of the decoder IC and output d7 of column indicator IR are connected to inputs of a NOR gate P21, so that when the receipt counter CR reaches step 7, gate 21 opens and causes the ejection of the badge by means of a circuit which comprises a NOR gate P22, a bistable flip-flop BB4 and a relay RL. A contact rl of the relay RL completes the circuit of a solenoid coil BE which ejects the badge. Output Q of the ejection flip-flop BB4 is connected through a lead be to an extra column CS of diodes of the optical reader LO so that the signal on be associated with the ejection of the badge causes the diodes of said columns to be triggered. Once the badge has been removed manually, a characteristic digit (10) is detected by the diodes of column CS and transmitted to the computer to indicate that the badge has been fully ejected. Ejection is also provoked in the following cases:

When the badge is not assigned to the terminal; comparator CIC gives an inhibition command through the gate P3 which causes the lighting of lock-out lamp LI, as it has been previously described: gate P3 also causes the ejection of the badge through a connection Y connected to an input of the gate P22.

When the computer detects a fault in the message which is transmitted; the computer then sends a characteristic number 13 to the terminal which is received in binary on inputs R1 to R4 of the transmitter/receiver unit ER1 and detected by a NAND gate P23 connected to an inverter I21. This gate controls a set input S of bistable flip-flop BB2 through an inverter I22 and a NOR gate P24. The Q output of the bistable BB2 delivers a signal which causes ejection command gate P22 to be opened via an intermediate NOR gate P25 whose second input is connected to output SO of the optical reader LO. The bistable BB2 controls via an output Q, the lighting of error-lamp LE and the locking-out of the counter CR through gate P12.

When the transmitter/receiver unit detects overloading, a parity or synchronization mistake, it delivers a signal on output OE, PE or FE, which causes a NOR gate P26 to be opened, opening the NOR gate P24 through inverter I23. The gate P24 changes the state of flip-flop BB2 which performs as before. Output of inverter I23 is connected through a lead ft to the clock input of a D-type bistable flip-flop BB5 (FIG. 3) whose D input is connected to the output SO of the optical reader and whose Q output is connected to the exclusive OR circuits OX and to the gate P5. The fault indicated by ER1 on OE, PE or FE leads to the changing of state of flip-flop BB5 which prepares circuits OX to be triggered in order to emit a characteristic digit (15) which indicates a transmission fault to the computer. The flip-flop BB5 locks out gate P5 and in doing so prevents the monostable flip-flop BM1 from triggering and the counter CE from passing to step 5. The Q output of the flip-flop BB5 supplies the exclusive OR circuits OX which mark binary digit 15 on inputs TR1 to TR4 of the unit ER1.

The ejection of the badge causes its partial removal from the reader slot. The badge is then pulled out manually. The complete withdrawal of the badge is detected by a NAND gate P27 which opens on a signal delivered on output F8 of the reader. The gate P27 resets the counters CE and CR through inverter I24 and gate P4 (connection Z) and through gate P10 respectively. The inverter I24 also resets bistables BB5 and BB1 when appropriate via a gate P23.

A knob BAL for inhibiting reading (FIG. 3) is connected to a NOR gate P30 as are the output D4 of the decoder IC and the output D7 of the indicator IR. The output of the NOR gate P30 is connected to a NOR gate P31 whose output drives the circuits OX. As long as the badge has not been pulled out manually, the owner of the badge can nullify a reading by activating the knob BAL: doing so, he moves the counter CE to step 5 via gates P30 and P2. The output D5 of the decoder IC opens the gate P31 which supplies circuits OX so as to send a digit characteristic of nullification to the computer.

Apart from dealing with reading requests when badges are inserted to mark the work time, the computer permanently transmits the data and the time which the terminal displays respectively on its display panels AFA and AFB.

A knob BRZ connected to gates P10 and P11 allows a manual resetting of the counter CR and the flip-flop BB2.

Figure 5:
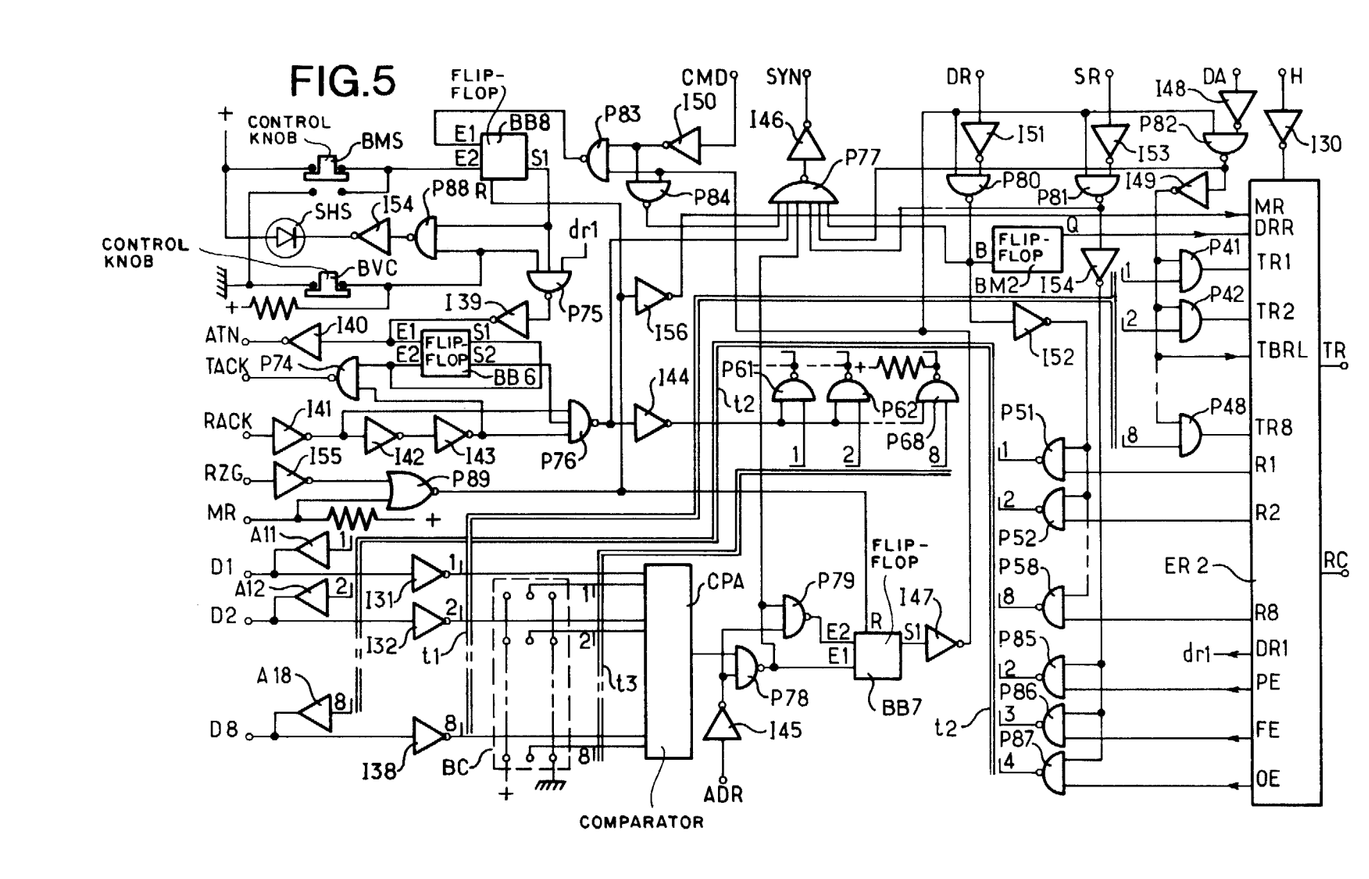
FIG. 5 is a circuit diagram of the coupler logic circuits.

The role of the coupler shown in FIG. 5 is to order the scheduling of exchanges between the computer and the terminal.

The connection between the coupler and the terminal is provided through a transmitter/receiver unit ER2 of the same type as unit ER1 of the terminal.

Data is exchanged on a bus with eight bidirectional channels connected to the computer through input-output terminals D1 to D8 of the coupler.

Data is transmitted in a parallel form from computer to coupler and then in a serial form from coupler to terminal (reading of one word). It passes through inputs D1 to D8, inverts I31 to I38, cable t1, AND gates P41 to P48, inputs TR1 to TR8 and output TR of unit ER2.

Data coming from the terminal to the computer (writing of a word) are received serially on input RC of unit ER2 and retransmitted in a parallel form to the computer through outputs R1 to R8 of said unit, NAND gates P51 to P58, cable t2, amplifiers A11 to A18 and outputs D1 to D8. The clock signals putting rhythm into the data transmission through unit ER2 are received in said unit through input H and inverter I30.

The coupler wired address is transmitted to the computer through a wired unit BC, a cable t3, AND gates P61 to P68, amplifiers A11 to A18 and outputs D1 to D8.

TRANSMISSION FROM TERMINAL TO COMPUTER

DATA TRANSMISSION

When the unit ER2 has received a word from the terminal, it signals the completion of the loading of its register by delivering a control signal on output DR1. The computer is informed that a coupler is calling by the control signal routed to output ATN through NAND gate P75 and inverters I39 and I40. The output of inveter I39 is connected to a bistable flip-flop BB6 which changes state, thus preparing the opening of a NAND gate P76 controlled by inverters I41 to I43 as soon as the computer answer signal is received on input RACK of the coupler.

When the coupler is not waiting for a signal on input RACK, flip-flop BB6 is resting, locking out gate P76 and allowing the opening of a NAND gate P74 at the receipt of answer signal on input RACK. Said signal is then sent back through gate P74 on output TACK to input RACK of the next coupler of the system.

The opening of gate P76 opens gates P61 to P68 via an inverter I44 allowing the coupler address to be sent to the computer. The gate P76 controls the opening of NAND gate P77 which delivers an enabling address signal to the computer. Gates P61 to P68 transmit the wired address of the coupler to the computer.

The computer presents the coupler address on inputs D1 to D8 and delivers in synchronism a control signal on input ADR. The received address is compared by comparator CPA to that of coupler wired in unit BC. Output of comparator CPA is connected to NAND gate P78 which controls NAND gate P79, input of said gates being connected to input ADR through an inverter I45 and their output being connected to inputs of bistable flip-flop BB7. Output of gate P78 is also connected to one input of gate P77, the comparator signal and the address control signal cause a change of state of bistable flip-flop BB7 and open gate P77. This delivers, through inverter I46, a signal on output SYN indicating to the computer that information received on channels D1 to D8 has been taken into account by the coupler.

Flip-flop BB7 prepares the opening NAND gates P80, P81, P82, P83, P84 through an inverter I47.

At receipt of the signal emitted on output SYN of the coupler, the computer presents on inputs D1 to D8 the information data to be transmitted and on input DR a signal allowing the loading of data in the register of unit ER2: the signal received on DR causes the opening of gate P80 through inverter I51 and the opening of gates P51 to P58 through inverter I52.

Via another connection the gate P80 triggers monostable flip-flop BM2 which delivers a signal on input DRR of unit ER2 causing suppression of the signal delivered on output DR1 of said unit.

TRANSMISSION OF A CONTROL SIGNAL

The call to the computer and the comparison of addresses are done in the same way as before.

As the computer has received a control instruction, it presents control data on inputs D1 to D8 and a signal on input CMD of the coupler. This signal causes, via inverter I50 and gate P83, the change of state of flip-flop BB8 which, by closing gate P75, inhibits the call signal which was delivered on output ATN, inhibiting any call to the computer, by the coupler.

The address comparison signal delivered on output of inverter I47 opens also NAND gate P84 whose output delivers, through gate P77, a signal on output SYN indicating to the computer that the control data have been taken into account.

TRANSMISSION FROM COMPUTER TO TERMINAL

As the computer receives from its program a data writing instruction, it presents, once the address comparision has been done as previously, a signal on input DA, thus opening gate P82 through inverter I48 and gates P41 to P48 through inverter I49. Said gates P41 to P48 transfer in the computer through cable t2 and outputs D1 to D8 data stored in the register of unit ER2.

The computer is informed that the data transfer is taken into account through gate P82 whose output is connected to one input of gate P77 (signal delivered on output SYN of the coupler). The designation of the terminal state (busy, out of order, etc . . . ) is done in the same way as what has been mentioned above, the computer then presenting a signal on input SR. This signal causes the opening of gate P81 through inverter I53 and that of NAND gates P85, P86 and P87 through inverter I54. The terminal state is transmitted to the computer through outputs PE, FE, OE of unit ER2 together with some outputs R1 to R8 through a gate circuit not drawn on the figure, cable t2 and outputs D1 to D8 of the coupler.

Data transmission errors coming from the terminal, such as parity, alignment and overloading errors are detected by unit ER and respectively signalled to the computer by a signal delivered according to the case, on outputs PE, FE or DE of said unit and going through cable t2 through gate P85, P86 or P87 which is opened on a request for the terminal state by the computer presenting a signal on input SR.

The coupler is put into service or withdrawn from it.

When the coupler is put into service, knob BMS is switched on an it sets flip-flop BB8 which causes gate P75 to be opened in order to call the computer. If a fault occurs in the computer, it notifies the coupler by a signal received on input CMD. Flip-flop BB8 changes state and locks out gate P75 thus inhibiting the coupler. Meanwhile, flip-flop BB8 opens a NAND gate P88 which, through inverter I54, permits the lighting of a lamp SHS signalling the fault.

Output of gate P89 is also connected to input MR of unit ER2 through inverter I56 so as to control the reset of the unit logic.

The manipulation of knob BVC allows the knocking out of gate P75, the opening of gate P88 and the lighting of lamp SHS when a check is necessary in the coupler circuits. The putting back into service is done by manipulating knob BMS. Send-receive circuits ER1 and ER2 are advantageously made of well known integrated transmitting circuits of TEXAS INSTRUMENTS type n°. TMS 6011.

We claim:

1. A data reading and processing system, for time recording and computing in a computer comprising at least one terminal (TL) for reading a number of a punched card or badge and connected to the computer via a coupler (CP) and a transmission link to the coupler, said transmission link including two telephone lines, said terminal comprising a reader (LO) for reading said number of the card or badge, a display, and a first transmitter/receiver circuit (ER1), said coupler comprising a second transmitter/receiver circuit (ER2), the terminal further comprising firstly a transmit logic circuit connecting the reader to the transmitter part of the first transmitter/receiver circuit for sequentially selecting parts of said number in the reader and transmitting the same to said transmitter part of the first transmitter/receiver circuit, and secondly a receive logic circuit connected to the receiver part of said first transmitter/receiver circuit and to said display for selecting and controlling data from the receiver part of said first transmitter/receiver circuit and transmitting said data to said reader, the coupler further comprising a coupling logic circuit connecting the second transmitter/receiver circuit to a bidirectional input/output bus of the computer for controlling data exchange between said terminal and the computer, said first and second transmitter/receiver circuits being so interconnected that data exchanged between the terminal and the coupler is carried out over said two telephone lines and comprises both-way transmission of said number in pairs of digits, said number being displayed on said display in the terminal after being received by the computer and being echoed back from the computer to the terminal after verification of said number by said computer.

2. A system according to claim 1, wherein the reader is an optoelectronic reader including columns of photoemitting diodes, each column being allocated to at least one digit of said number of the badge, and the transmit logic circuit of said terminal comprises sequential means for activating in turn each column of the reader, means for comparing the first digit of the number with a wired digit assigned to the terminal and for ejecting the badge if the comparison is invalid, means for reading and transferring the next digits to the transmitting part of the first transmitter/receiver circuit (ER1), means for transmitting a characteristic digit to the computer at the end of reading or in the case of a fault in receipt detected by the receive part of the first transmitter/receiver circuit (ER1) and means for reading a cancellation signal.

3. A system according to claim 1, wherein the receive logic circuit of the terminal has means for designating storage registers for displaying received digits and associated means for clearing a buffer receive register of the first transmitter/receiver circuit (ER1), means for transferring digits to said registers, means for ejecting the card or badge after reading or in the case of a fault, means for detecting a characteristic digit or a command indicating a fault signal delivered by the computer or by the first transmitter/receiver circuit (ER1), and means for detecting the end of reading means for indicating cancellation to the computer.

4. A system according to claim 2, having for the designation of columns of diodes reading data in the optoelectronic reader, a transmission binary counter (CE) associated with a binary to decimal decoder for indicating said columns (IC), outputs (D1 to D4) of said decoder being connected to column inputs (C1 to C4) of the optoelectronic reader, and the input of said binary counter being connected to advance on digit receipt (connection er, gates P0 and P2), said advance being actuated at receipt of each digit in the receive part of the terminal.

5. A system according to claim 4, having, for the reading and comparison of the first digit assigned to the terminal, data of the first column of diodes designated at step 1 of the binary counter which are received in a comparator (C1C) and compared with a wired binary digit, said comparator setting a bistable flip-flop (BB1) in case of wrong comparison and said flip-flop causing the reset of the counter and the lighting of a reading inhibition lamp (LI).

6. A system according to claim 5, wherein, in order to transmit a characteristic digit to the computer in case of wrong receipt detected by the receive part of the first transmitter/receiver circuit (ER1) said receive part delivers a signal on a bistable flip-flop (BB5) whose output feeds, through "exclusive OR" (OX) circuits, some of the inputs (TR1 to TR4) of the first transmitter/receiver circuit (ER1) for the transmission in binary code of the characteristic digit.

7. A system according to claim 3, including a binary receive counter (CR) for the designation of storage registers for displaying received digits and also for clearing a receive buffer register of the first transmitter/receiver circuit (ER1); said binary receive counter being associated with a register indicator decimal decoder having outputs (D1 to D7) connected to said storage registers (RG1, RG2, ...) through access-controlling NOR gates (P14 to P20) whose opening is controlled by the receive logic part of the first transmitter/receiver circuit (ER1) through a bistable flip-flop (BB3), a data input (D) of said flip-flop being connected to an output (DR2) indicating the end of the loading of the buffer register of said receiver circuit, an output (Q) of said flip-flop being connected to a gate (P13) opening said gates according to clock signals, and an output (Q) of said flip-flop being connected to a circuit input (RRD) to clear data in said receive buffer register.

8. A system according to claim 7, which has for the transfer of the digits of the buffer register of the first transmitter/receiver (ER1) into the concerned storage registers, inputs of said storage registers connected to receive outputs (R1 to R8) of the first transmitter/receiver circuit (ER1), one output (DR2) of said circuit (ER1), indicating the end of the loading of the buffer register of said circuit (ER1) being connected to the clock input of said binary receive counter (CR) through a gate (P12) so as to control the progress of said counter in order to transfer each received digit into the register which is assigned to it.

9. A system according to claim 8, including means for ejecting the card or badge after reading comprising a NAND gate (P21) with two inputs respectively controlled by output (D4) of column indicator (IC) triggered at transmission end and by output (D7) of register indicator (IR) triggered at receipt end, said gate energizing an ejection reel (BE) through an OR gate (P22), a bistable flip-flop (BB4) and a relay (RL).

10. A system according to claim 9, including means for ejecting the card or badge in case of fault detected by the computer comprising a gate (P23) of detection of a characteristic binary digit (13) emitted by the computer and retransmitted on the receipt outputs (R1 to R4) of the first transmitter/receiver circuit (ER1), the output of the detection gate being connected to gate (P22) of the ejection circuit, through, on the one hand, a routing gate (P24) and a bistable flip-flop (BB2) commanding an error lamp (LE) and the inhibition of the receipt counter (CR) and, on the other hand, through a gate (P25) indicating the presence of the number.

11. A system according to claim 10, wherein, for the ejection of the card or badge in case of transmission fault detected by the first transmitter/receiver circuit (ER1), the outputs of said first transmitter/receiver circuit (ER1), showing overloading (OE), alignment (FE) or parity (PE) errors, are connected to an OR gate (26) setting the ejection circuit through a routing gate (P24).

12. A system according to claim 11, including means for coupling the terminal to the computer comprising a column of additional diodes (CS) of the optoelectronic reader (LO) connected to the ejection circuit so that ejection followed by the manual pulling out of the card or badge causes by said column the emission of a digit characteristic of the reading end.

13. A system according to claim 12, including means for producing nullification at the computer comprising a reading nullification knob (BAL) connected to a nullification gate (P30) whose opening is controlled by outputs (D4 and D7) of indicators (IC and IR), said gate commanding an auxiliary gate (p31) controlled by output (D5) of indicator (IC), the output of said auxiliary gate being connected to exclusive OR circuits (OX) to emit a characteristic nullification digit.

14. A system according to claim 1, wherein said coupler comprises computer calling means controlled from the second transmitter/receiver circuit (ER2), data transmission means co-operating with said second transmitter/receiver circuit in the direction of computer to terminal, data and information transmission means co-operating with said circuit in the direction of terminal to computer, and means for putting the coupler into service and withdrawing it from service.

15. A system according to claim 14, wherein said coupler has an output (DR1) indicator of data receipt of said second transmitter/receiver circuit (ER2) connected to a gate (P75) whose opening allows the delivering of a call command on output (ATN) of the coupler, a bistable flip-flop (BB6) storing said call and preparing the opening of an address command gate (P76) letting the coupler address (cf) to be sent when the computer answers.

16. A system according to claim 14, wherein said coupler with the data transmission means co-operates with said second transmitter/receiver circuit (ER2) in the direction of computer to terminal, said coupler having bus inputs (D1 to D8) respectively connected to data transmitter gates (P41 to P48), each of said gates having a second output connected in a common point, on the one hand, to a data transmission command input (DA) of the coupler through gate (P82) released by the address comparison signal, and, on the other hand, to a loading command input (TBRL) of the circuit buffer register.

17. A system according to claim 14 wherein said data transmission means operates in the direction of terminal to computer, with the receipt outputs (R1 to R8) of the first transmitter/receiver circuit respectively connected to data transmitter gates (P51 to P58) transmitting data to coupler bus outputs (D1 to D8), each of said gates having an input connected in a common point to a coupler data request input (DR) through a gate (P80) released by the address comparison signal, the output of said gate being connected to the input of a monostable flip-flop (BM2) whose output is connected to a reset input (DRR) of the output signal (DR1) indicator of data receipt.

18. A system according to claim 14 wherein said data transmission means operates in the direction of terminal to computer, with outputs signalling parity, alignment and overloading errors (PE, FE, OE) of the second transmitter/receiver circuit (ER2) respectively connected to gate (P85, P86, P87) for transmitting said data to bus outputs (D1 to D8) of the coupler, each of said gates having an input connected in a common point to a state reading input (SR) of the coupler through a gate (P81) released by the address comparison signal.

19. A system according to claim 14 including means for putting the coupler into service or withdrawing it from service, said coupler having, on the one hand, a start key (BMS) to set a bistable flip-flop (BB8) whose input is connected to a coupler command input (CMD), whose output is connected to a letting in call gate (P75) and to a power circuit gate (P88) of an unused signalling lamp (SHS), on the other hand, a coupler locking out knob (BVC) whose action allows the locking out of the letting in call gate and the opening of the unused signalling circuit gate, the withdrawing from service of the coupler being also obtained from the computer by a command signal arriving at coupler input (CMD).

20. A system according to claim 1 wherein said transmitter/receiver circuit (ER1) is connected to coupler (ER2), through two links (p1, p2) and two electromechanical (RE1-RR1, RE2-RR2) or optoelectric relays set between the ends of said links and said first and second transmitter/receiver circuits.

* * * * *